United States Patent
Lanterna et al.

(10) Patent No.: US 9,599,991 B2
(45) Date of Patent: Mar. 21, 2017

(54) METHOD AND DEVICE FOR AUTOMATICALLY ENGAGING AN AUTOMATED EMERGENCY DESCENT OF AN AIRCRAFT

(71) Applicant: Airbus Operations (SAS), Toulouse (FR)

(72) Inventors: Florent Lanterna, Toulouse (FR); Frederic Dewasne, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 14/803,895

(22) Filed: Jul. 20, 2015

(65) Prior Publication Data

US 2016/0026188 A1    Jan. 28, 2016

(30) Foreign Application Priority Data

Jul. 23, 2014  (FR) ...................... 14 57090

(51) Int. Cl.
   *G05D 1/04*   (2006.01)
   *G05D 1/00*   (2006.01)
   (Continued)

(52) U.S. Cl.
   CPC ........... *G05D 1/042* (2013.01); *G05D 1/0055* (2013.01); *G05D 1/0607* (2013.01); *G01C 23/00* (2013.01); *G05D 1/0061* (2013.01)

(58) Field of Classification Search
   USPC .......... 701/4–5, 8, 11, 14, 301; 342/36, 455; 340/463, 471
   See application file for complete search history.

(56) References Cited

U.S. PATENT DOCUMENTS 3,644,722 A * 2/1972 Hobbs ................. G05D 1/0607 244/189
6,711,478 B2 * 3/2004 Hilb ..................... G05D 1/0607 340/970

(Continued)

FOREIGN PATENT DOCUMENTS

EP          3039665 A1 * 7/2016 ........... G08G 5/0026
WO    WO 2015031281 A1 * 3/2015 ........... G08G 5/0026

OTHER PUBLICATIONS

Enhanced Low Visibility Operations—Increasing flight operations services in the National Airspace System in low visibility conditions; Saly L. Frodge; Chris Hope; Rob Haughton; Position Location and Navigation Symposium (PLANS), 2012 IEEE/ION Year: 2012; pp. 216-224, DOI: 10.1109/PLANS.2012.6236883.*

(Continued)

*Primary Examiner* — Cuong H Nguyen
(74) *Attorney, Agent, or Firm* — Greer, Burns & Crain Ltd.

(57) ABSTRACT

A device for automatically engaging an automated emergency descent of an aircraft. The device comprises a monitoring unit configured to automatically compare, repetitively, a current cabin altitude of the aircraft to an engagement threshold representing an altitude value, an activation unit configured to automatically engage the automated emergency descent when the current cabin altitude reaches the engagement threshold called main engagement threshold, and a unit for generating at least one engagement threshold configured at least to adapt the main engagement threshold according to the terrain, the main engagement threshold corresponding to the sum of a terrain altitude and a predetermined margin.

10 Claims, 2 Drawing Sheets

(51) Int. Cl.
  *G05D 1/06* (2006.01)
  *G01C 23/00* (2006.01)

(56) References Cited

U.S. PATENT DOCUMENTS

| | | | | |
|---|---|---|---|---|
| 7,437,245 | B2* | 10/2008 | Ybarra | G05D 1/0607 340/945 |
| 7,792,615 | B2* | 9/2010 | Aimar | G01C 23/00 701/11 |
| 8,477,048 | B2* | 7/2013 | Botargues | G01S 13/9303 340/463 |
| 8,897,935 | B2* | 11/2014 | Meunier | G01C 23/005 340/947 |
| 9,242,725 | B1* | 1/2016 | Lord | B64C 19/00 |
| 2002/0077731 | A1* | 6/2002 | Hilb | G05D 1/0607 701/4 |
| 2004/0094666 | A1* | 5/2004 | Rogitz | B64C 13/18 244/118.5 |
| 2007/0043482 | A1* | 2/2007 | Aimar | G01C 23/00 701/4 |
| 2009/0228161 | A1* | 9/2009 | Botargues | G05D 1/0055 701/11 |
| 2012/0022723 | A1* | 1/2012 | Botargues | G05D 1/0055 701/4 |
| 2014/0365041 | A1* | 12/2014 | Deker | G05D 1/0607 701/4 |

OTHER PUBLICATIONS

A new hybrid culling scheme for flight simulator; Chungjae Lee; Seok-Yoon Kang; Kyong Hoon Kim; Ki-Il Kim; 2014 IEEE/AIAA 33rd Digital Avionics Systems Conference (DASC); Year: 2014; pp. 1-7, DOI: 10.1109/DASC.2014.7086911.*

Observed Pilot-Vehicle Loop-Closure Characteristics for Hovering Aircraft Control; T. E. Lollar; J. Matous; IEEE Transactions on Human Factors in Electronics; Year: 1963, vol. HFE-4, Issue: 1; pp. 60-63, DOI: 10.1109/THFE.1963.231288.*

Contour Based Path Planning for Unmanned Aerial Vehicles (UAVs) over Hostile Terrain; Kan Ee May; Doan Van Khanh; Tan Chiew Seng; Yeo Swee Ping; Ho Jiun Sien; Soft Computing and Pattern Recognition, 2009. SOCPAR '09. International Conference of; Year: 2009; pp. 732-735, DOI: 10.1109/SoCPaR.2009.148.*

Defining maximum safe maneuvering authority in 3D space required for autonomous integrated conflict resolution A. A. Lambregts; J. Tadema; R. M. Rademaker; E. Theunissen; 2009 IEEE/AIAA 28th Digital Avionics Systems Conference Year: 2009; pp. 5.C.1-1-5.C.1-17, DOI: 10.1109/DASC.2009.5347465.*

French Search Report, Mar. 9, 2015.

* cited by examiner

METHOD AND DEVICE FOR AUTOMATICALLY ENGAGING AN AUTOMATED EMERGENCY DESCENT OF AN AIRCRAFT

CROSS-REFERENCES TO RELATED APPLICATIONS

This application claims the benefit of the French patent application No. 1457090 filed on Jul. 23, 2014, the entire disclosures of which are incorporated herein by way of reference.

BACKGROUND OF THE INVENTION

The present invention relates to a method and a device for automatically engaging an automated emergency descent of an aircraft.

The present invention applies to an aircraft, in particular a transport airplane, provided with an automated emergency descent function. Such a function aims to assist the crew of the aircraft in case of emergency descent or to automatically perform said descent if a depressurization is detected. An emergency descent maneuver consists in bringing the aircraft as rapidly as possible to a safety altitude, generally 10 000 feet (approximately 3000 meters) or to the minimum safety altitude which is a function of the elevation of the terrain.

In effect, following a failure (failure of a system or a leak from the cabin), it may be that the pressurization of the aircraft can no longer supply sufficient oxygenation for the pilots and the passengers and cause the altitude of the cabin to exceed a threshold (generally 14 000 feet) which triggers the releasing of the oxygen masks in the cabin. The crew must then apply an emergency descent, which makes it possible to limit the time of exposure of the passengers and of the crew members to the lack of oxygen.

This automated emergency descent can be initiated (or engaged), either manually by the pilot, or automatically when the crew is unconscious, as described for example in the published U.S. Patent Application 2009/0228161.

It is known that the purpose of the pressurization system of the aircraft is to maintain the cabin of the aircraft at an altitude compatible with human life by managing the pressure of the cabin. Thus, when the altitude of the aircraft increases during the climb, the atmospheric pressure decreases, this decrease in the atmospheric pressure being compensated by the pressurization system which adjusts the cabin pressure. When the aircraft is cruising, the cabin is maintained at the pressure adopted during the climb, so the cabin pressure allows the passengers and the crew members to breathe normally.

Furthermore, during the descent, the altitude of the aircraft decreases and the atmospheric pressure increases. The pressurization system adapts the cabin pressure to the height of the destination airport. So, when the aircraft arrives on the ground, the cabin pressure is equal to the atmospheric pressure.

The automatic engagement of the emergency descent function is based mainly on a criterion related to an altitude equivalent to the cabin pressure. Generally, if the altitude reached by the cabin (this altitude is representative of a pressure value relative to the pressure inside the cabin) exceeds a set threshold of 14 000 feet for 15 seconds, the emergency descent function is automatically engaged.

However, the runway altitude of certain existing airports or airports under construction is close to or greater than this threshold of 14 000 feet.

The automated emergency descent function is therefore engaged if the altitude of the cabin exceeds an engagement threshold. However, this engagement must not occur if the aircraft is close to the ground (in case of approach and of take-off) or if the cabin is deliberately depressurized because of operational constraints such as take-off from or approach to an airport at high altitude.

So, there arises the issue of activation (or of engagement) of the emergency descent function in certain operations, notably on airports at high altitudes.

SUMMARY OF THE INVENTION

An object of the present invention is to remedy this drawback. It relates to a method for automatically engaging an automated emergency descent of an aircraft, said method comprising a step a) comprising automatically comparing, repetitively, a current cabin altitude of the aircraft to an engagement threshold representing an altitude value, and a step b) comprising automatically engaging said automated emergency descent when the current cabin altitude reaches said engagement threshold called main engagement threshold.

According to the invention, said method for automatically engaging an automated emergency descent comprises an additional step consisting in adapting the main engagement threshold according to the terrain, said main engagement threshold corresponding to the sum of a terrain altitude and a predetermined margin.

Thus, by virtue of the invention, the engagement threshold used to engage the emergency descent is adapted to the altitude of the terrain, which makes it possible to remedy the abovementioned drawback and increase the availability and dependability of the emergency descent function.

Advantageously, said terrain altitude corresponds to one of the following altitudes:

an altitude of a take-off runway, supplied by a pressure regulation system of the cabin of the aircraft;

an altitude of a landing runway, supplied by the pressure regulation system of the cabin of the aircraft; and an altitude of a landing runway, supplied by a flight management system of the aircraft.

In a particular embodiment, the method includes an additional step comprising defining an additional engagement threshold called default engagement threshold, and the step b) uses this default engagement threshold as engagement threshold for the automated emergency descent, in the absence of an engagement threshold other than this default engagement threshold.

Furthermore, advantageously, the method includes additional steps comprising, respectively:

determining a rate of variation of an altitude called cabin altitude;

comparing this rate of variation to a threshold value; and automatically engaging said automated emergency descent if said rate of variation exceeds said threshold value.

Moreover, advantageously, for an aircraft provided with a pressure regulation system of the cabin, configured to be able to be brought into a manual mode, in which the crew is able to manually select an altitude called cabin altitude, said method includes an additional step comprising defining an additional engagement threshold called auxiliary engagement threshold, this auxiliary engagement threshold depending on a maximum altitude that can be selected by the crew, and the step b) uses this auxiliary engagement threshold as engagement threshold for the automated emergency descent, in place of said main engagement threshold, when the pressure regulation system of the cabin is in the manual mode.

Furthermore, advantageously, the method includes an additional step comprising defining an additional engagement threshold called ceiling engagement threshold, and the step b) uses this ceiling engagement threshold as engagement threshold for the automated emergency descent, in case of failure rendering the main engagement threshold unavailable or unusable.

The present invention further relates to a process for implementing an automated emergency descent which comprises a method as mentioned above for automatically engaging the automated emergency descent.

The present invention relates also to a device for automatically engaging an automated emergency descent of an aircraft, said device comprising:
- a monitoring unit configured to automatically compare, repetitively, a current cabin altitude of the aircraft to an engagement threshold representing an altitude value; and
- an activation unit configured to automatically engage said automated emergency descent when the current cabin altitude reaches said engagement threshold called main engagement threshold.

According to the invention, said device further comprises a unit for generating at least one engagement threshold, configured at least to adapt the main engagement threshold according to the terrain, said main engagement threshold corresponding to the sum of a terrain altitude and a predetermined margin.

The present invention further relates to a system for implementing an automated emergency descent, said system comprising at least:
- a control assembly configured to perform an automated emergency descent; and
- a device for automatically engaging the automated emergency descent, as mentioned above.

The present invention relates also to an aircraft, in particular a transport airplane, which is provided with a device and/or a system as specified above.

In a particular embodiment, said aircraft comprises a flight management system and a pressure regulation system of the cabin which are configured to supply information to said system for implementing an automated emergency descent.

BRIEF DESCRIPTION OF THE DRAWINGS

The attached figures will give a good understanding of how the invention can be produced. In these figures, identical references designate similar elements.

DETAILED DESCRIPTION OF THE PREFERRED EMBODIMENTS

Figure 1:
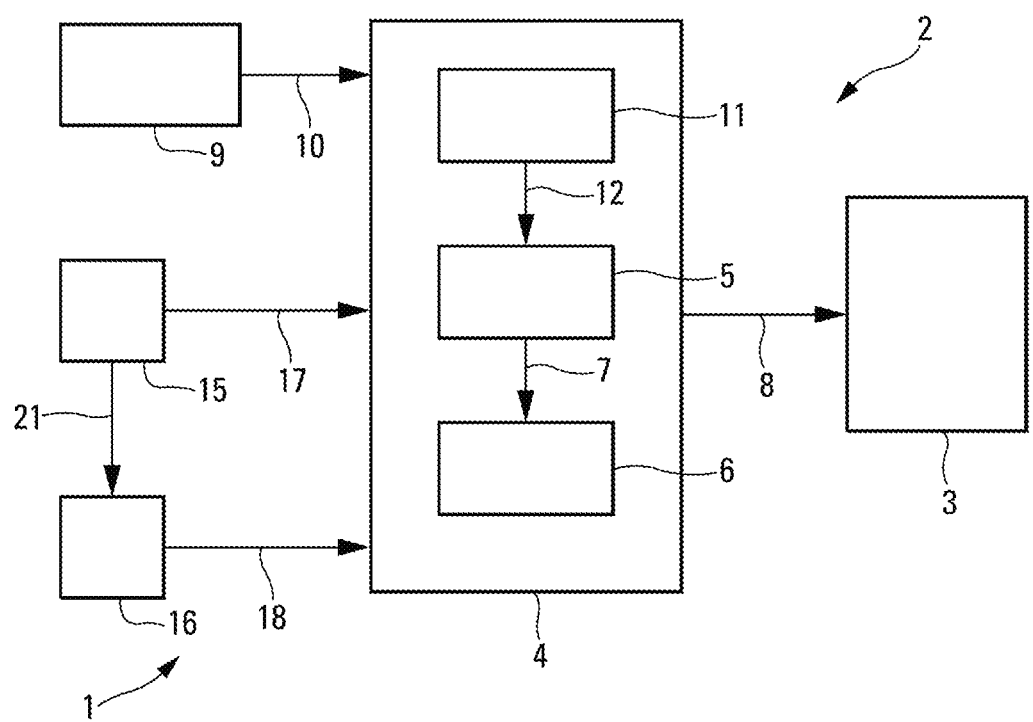
FIG. 1 is a block diagram of a system for implementing an automated emergency descent, which comprises an automatic engagement device illustrating an embodiment of the invention.

The device 1 schematically represented in FIG. 1 and making it possible to illustrate the invention, is a device for automatically engaging an automated emergency descent of an aircraft, in particular of a transport airplane, and more generally a device for controlling the emergency descent.

Said device 1 for automatically engaging the emergency descent forms part of a system 2 for implementing an automated emergency descent. This system 2 also comprises a control assembly 3 configured to perform, in the usual manner, an automated emergency descent. This control assembly 3 which is known is not described further in the present description and can represent any usual assembly suitable for implementing all the functions and actions relating to an automated emergency descent.

The device 1 comprises an engagement unit 4 comprising:
- a monitoring unit 5 configured to automatically compare, repetitively, a current cabin altitude of the aircraft to an engagement threshold representing an altitude value. This cabin altitude is representative of a current pressure value relative to the pressure inside the cabin; and
- an activation unit 6 configured to automatically engage said automated emergency descent when the monitoring unit 5 informs it (via a link 7) that the current cabin altitude has reached said engagement threshold called main engagement threshold. In this case, the activation unit automatically activates (or engages), in the usual manner, the control assembly 3 via a link 8.

The device 1 also comprises a set 9 of sources of information which comprise at least one usual means, for example, a pressure regulation system of the cabin as specified below, which is able to determine the current cabin altitude (corresponding to the altitude representative of the cabin pressure) of the aircraft, and to supply it to the engagement unit 4 and, in particular, to the monitoring unit 5 via a link 10.

Figure 2:
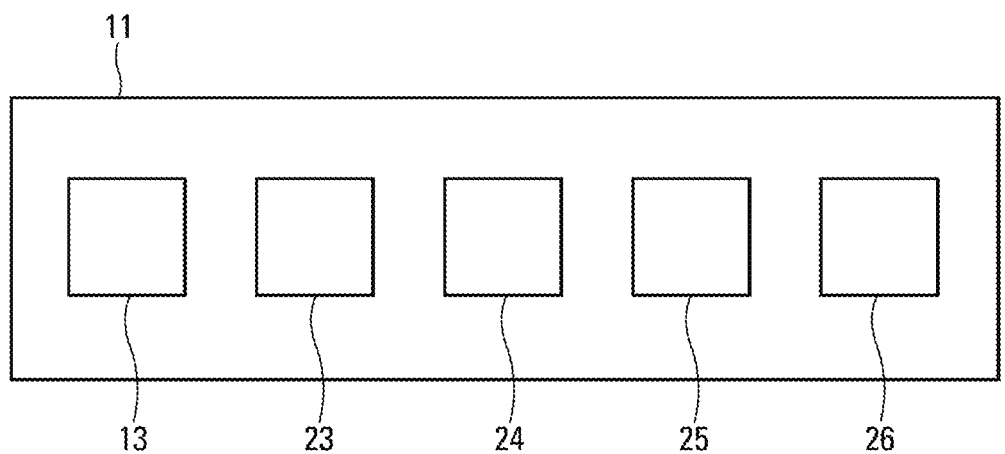
FIG. 2 is a block diagram of a particular unit of the device represented in FIG. 1.
Figure 3:
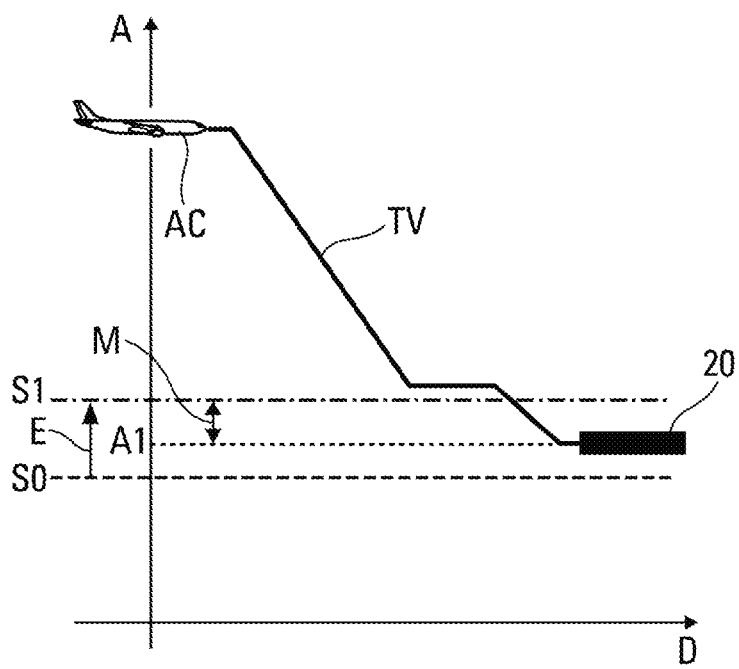
FIG. 3 schematically shows a situation relating to a landing on an airport at high altitude, making it possible to highlight features of the invention.

According to the invention, said device 1 also comprises a unit 11 for generating engagement threshold values. According to the invention, this unit 11 is configured at least to adapt the main engagement threshold according to the terrain, and transmit it via a link 12 to the monitoring unit 5 for it to use this (engagement threshold) value and compare it to the current cabin altitude of the aircraft. To do this, the unit 11, which forms part of the engagement unit 4, comprises, as represented in FIG. 2, a computation element 13 which calculates the sum of a terrain altitude Ai and of a predetermined margin M to compute the main engagement threshold S1, as represented in FIG. 3 (for a terrain altitude A1).

In a preferred embodiment, this predetermined margin M which represents a safety margin is equal to 1000 feet, and it is recorded in a memory of the device 1 and notably of the unit 11.

Thus, the device 1 adapts to the terrain altitude specified below, the engagement threshold used (by the monitoring unit 5) to detect the conditions of engagement of the emergency descent, which makes it possible to increase the availability and dependability of the emergency descent function implemented by the control assembly 3.

The device 1 is also associated with a flight management system 15 of FMS type and with a pressure regulation system 16 of the cabin which, for example, form part of the set 9 of sources of information and which supply information to the device 1, notably to the engagement unit 4, via, respectively, links 17 and 18.

In the context of the present invention, the terrain altitude Ai (or setpoint altitude) which is used by the unit 11 to compute the engagement threshold, can correspond, according to the embodiments, as specified below, to one of the following altitudes:
- an altitude A3 of a take-off runway or an altitude A1 of a landing runway 20 (FIG. 3), supplied by the pressure regulation system 16 of the cabin via the link 18; and
- an altitude A2 of a landing runway, supplied by the flight management system 15 via the link 17.

The device 1 thus adapts the engagement threshold S1 to retain suitable safety margins with respect to the altitude of the take-off or landing terrain.

As shown, for example, in FIG. 3, in which there is represented, in a diagram illustrating the altitude A as a function of the distance D traveled by the aircraft AC along the lateral trajectory from its current position, the vertical trajectory TV of the aircraft AC which performs a descent with a view to a landing on the landing runway 20 of altitude A1. If this altitude A1 is a high altitude, for example, higher than 14 000 feet, the use of a usual engagement threshold S0 lower than this altitude A1 would be inappropriate. So, by virtue of the invention, the unit 11 adapts the engagement threshold to the altitude of the terrain and increases it, as represented by an arrow E, to define a new engagement threshold, namely the main engagement threshold S1, which makes it possible to remedy the abovementioned drawback.

In a preferred embodiment, the device 1 uses regulation data from the pressure regulation system 16 of the cabin. In this case:
- during the take-off phase of the aircraft, the pressure regulation system 16 of the cabin sends the value of the cabin altitude via the link 18 to the engagement unit 4 of the device 1, which stores it. This cabin altitude value corresponds to the altitude of the take-off runway; and
- as soon as the flight plan is defined, on the ground, the altitude of the landing runway is sent in the usual way to the pressure regulation (or pressurization) system 16 of the cabin by the flight plan management system 15 (via a link 21). The system 16 then sends this datum to the engagement unit 4 of the device 1 via the link 18.

These take-off and landing runway altitudes make it possible to adapt the engagement threshold S1 of the automatic emergency descent function, in accordance with the setpoints of the pressure regulation system 16 of the cabin.

In the usual manner, the altitude setpoint determined by the cabin pressure regulation system 16 is updated according to the flight phases and controls the cabin altitude. It can be used in order for the engagement threshold to take the same value plus a safety margin, for example of 1000 feet.

In a variant of this embodiment, the device 1 uses the value of the altitude of the landing runway from the flight management system 15, and does so:
- either in place of that of the pressure regulation system 16 of the cabin;
- or in addition thereto. In this latter case, the device 1 comprises means (incorporated for example in the unit 11) for comparing these values with one another and for using, as altitude value for the computation of the engagement threshold, the highest value of the two values received.

The device 1 therefore adapts the engagement threshold above which the emergency descent function is engaged (implemented by the control assembly 3), according to information corresponding to an altitude value. The engagement threshold above which the emergency descent function is engaged is therefore chosen to be equal to this altitude (or setpoint altitude) value, uprated by a predetermined margin (for example 1000 feet).

In a particular embodiment, the unit 11 of the device 1 determines an engagement threshold for the automatic emergency descent which is adjusted according to the type of operation implemented by the aircraft to maximize performance.

Moreover, in a particular embodiment, the unit 11 of the device 1 comprises, as represented in FIG. 2, a computation element 23 for defining an additional engagement threshold S2 corresponding to a default engagement threshold and representing a floor engagement threshold. The monitoring unit 5 uses this default engagement threshold S2 (received from the unit 11 via the link 12) as engagement threshold for the automated emergency descent, in the absence of a valid engagement threshold other than this default (floor) engagement threshold.

This default engagement threshold S2 may be exceeded by a higher main engagement threshold S1 as mentioned above, that is to say that which is adapted according to the altitude of the terrain. This value of the default engagement threshold S2 can be based on the altitude of releasing of the oxygen masks (14 000 feet), or on any other value. The objective is to set a floor value which makes it possible to ensure the earliest possible engagement of the emergency descent.

Moreover, when the pressure regulation system 16 of the cabin is configured so as to be able to be brought into a manual mode, in which the crew is notably able to manually select an altitude called cabin altitude, the unit 11 of the device 1 comprises, as represented in FIG. 2, a computation element 24 for defining an additional engagement threshold S4 called auxiliary engagement threshold. This auxiliary engagement threshold S4 depends on a maximum altitude that can be selected by the crew on the pressure regulation system 16 of the cabin. The engagement unit 4 uses this auxiliary engagement threshold S4 as engagement threshold for the automated emergency descent, in place of the main engagement threshold S1, when the pressure regulation system 16 of the cabin is in the manual mode. More specifically, if appropriate, the pressure regulation system 16 of the cabin informs the engagement unit 4 via the link 18 that it is in manual mode. The unit 11 of the engagement unit 4 then determines, using the computation element 24, an auxiliary threshold S4 which is suited to this manual mode, and it transmits it to the monitoring unit 5 via the link 12.

The pilot can notably use the manual mode of the system 16, if he or she does not want the system 16 to pursue a standalone regulation, according to operational considerations.

Preferably, this auxiliary engagement threshold S4 is equal to the sum of the maximum cabin altitude setpoint, that is to say the maximum altitude that can be selected by the crew, and a safety margin, and this is so when the system 16 is in manual mode. This manual mode is activated when the crew manually selects a cabin (target) altitude. In a particular embodiment, the engagement threshold S4 can be defined at the value of 16 000 feet, for example, if the maximum altitude that can be selected is 15 000 feet, thus ensuring a safety margin of 1000 feet.

It is also possible to provide for an adaptation of the auxiliary engagement threshold S4 according to the type of the aircraft.

In particular, for an aircraft corresponding to a cargo airplane, the auxiliary engagement threshold S4 can be increased to an altitude of 21 000 feet, in order to adapt to the specific procedures of this type of cargo airplane. The value of 21 000 feet corresponds to the sum of the maximum value (20 000 feet) that can be selected by the crew on a usual cargo airplane, and of a safety margin of 1000 feet.

Moreover, in a particular embodiment:

the unit 11 of the device 1 comprises, as represented in FIG. 2, a usual unit 25 for determining a rate of variation (vertical) of the cabin altitude, which corresponds to the altitude that outside has the same pressure as the pressure considered inside the cabin. Also, a decompression (that is to say a lowering of pressure inside the cabin) corresponds to an increase in cabin altitude, the pressure dropping when the altitude increases. In a variant embodiment, the rate of vertical variation is computed by the system 16 which transmits it via the link 18 to the monitoring unit 5 of the engagement unit 4;

the monitoring unit 5 compares this rate of variation received to a stored threshold value; and the activation unit 6 automatically engages the automated emergency descent, if the monitoring unit 5 concludes that the rate of variation exceeds said threshold value.

This particular embodiment thus makes it possible to produce an adaptation of the engagement of the emergency descent as a function of the severity of a decompression, that is to say according to the rate of decompression (generating a variation of the cabin altitude). The definition of the engagement threshold is therefore based on the vertical rate of the cabin altitude. This engagement threshold makes it possible to anticipate the emergency descent of the aircraft before the decompression reaches a critical value if it is severe, or else, on the contrary, leave sufficient time for the crew to react if it is slow.

This taking account of the rate of decompression makes it possible to increase the efficiency of the device 1 by adapting its responsiveness according to the type of decompression encountered.

Moreover, in a particular embodiment, the unit 11 of the device 1 comprises a computation element 26 for defining an additional engagement threshold called ceiling engagement threshold S3. The engagement unit 4 uses this ceiling engagement threshold S3 as engagement threshold for the automated emergency descent, in case of failure rendering the main engagement threshold S1:

either unavailable, that is to say, that no value of this main engagement threshold S1 is present;

or unusable, that is to say that a value of this main engagement threshold S1 may be present, but it cannot be used, because the input data for the engagement unit 4 do not make it possible to check that this main engagement threshold S1 is an appropriate threshold.

This embodiment using a ceiling engagement threshold S3 ensures minimal performance levels in case of failure, that is to say that it ensures an irreducible safety margin between the altitude of engagement of the emergency descent and the ground.

This embodiment relies on the definition of a ceiling engagement threshold S3 which exceeds the default engagement threshold S2 when a fault occurs. The type of fault considered is notably the unavailability of the take-off altitude or of the landing altitude.

This ceiling engagement threshold S3 is preferably defined with the value of 18 000 feet, in order to ensure a margin of 2000 feet with the ground on an airport theoretically the highest in the world. The altitude of the highest airport in the world is taken to be equal to 16 000 feet, in order to be adapted to that of future airports situated at altitudes higher than those which currently exist.

Figure 4:
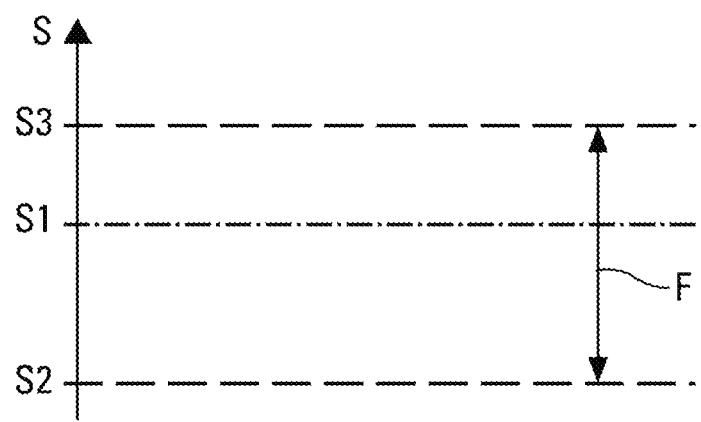
FIG. 4 schematically illustrates the possible variation of an engagement threshold.

Thus, by combining the abovementioned particular embodiments, there is obtained, when the regulation system 16 of the cabin is in automatic mode, a main engagement threshold S1 which is adapted to the terrain, notably as a function of an altitude value and which can vary, as represented in FIG. 4 (which illustrates the possible variation of the engagement threshold S), between a floor engagement threshold S2, for example of 14 000 feet, and a ceiling engagement threshold S3, for example of 18 000 feet, as illustrated by a double arrow F.

Thus, through the use of the floor engagement threshold S2, which makes it possible to engage the emergency descent as soon as the value of 14 000 feet (for example) is reached, the people in the aircraft AC are exposed for the shortest time possible to a lack of oxygen.

Furthermore, the ceiling engagement threshold S3 makes it possible to have a limit engagement value and thus overcome any failures.

These values and notably the ceiling engagement value S3 can be exceeded in the case where the pilot manually manages the system 16 as specified above.

Consequently, the device 1 automatically engages the automated emergency descent function (implemented by the control assembly 3) if the altitude value of the aircraft AC exceeds the engagement threshold S1, S2, S3 concerned. The value of the engagement threshold can be adapted for this engagement not to occur if the aircraft is close to the ground (in case of approach and of take-off) or if the cabin is deliberately depressurized, because of operational constraints such as take-off from or approach to an airport at high altitude.

However, an engagement threshold that is as low as possible will be sought, because, the lower the engagement threshold, the more efficient the function, because it minimizes the time of exposure of the passengers, of the crew and of the navigating personnel to the lack of oxygen. The engagement threshold can also be adapted by the engagement unit 4 to different situations likely to be encountered, which makes it possible to increase the availability of the function and thus its effectiveness.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatically engaging an automated emergency descent of an aircraft, said method comprising the steps of:

automatically comparing using a monitoring unit, repetitively, a current cabin altitude of the aircraft to a first engagement threshold representing an altitude value;

automatically engaging said automated emergency descent using an activation unit when the current cabin altitude reaches said first engagement threshold; and generating a second engagement threshold according to a terrain using an engagement unit, said second engagement threshold corresponding to a summed value of a terrain altitude and a predetermined margin associated with the terrain.

2. The method as claimed in claim 1, wherein said terrain altitude corresponds to one of the following altitudes:

an altitude of a take-off runway, supplied by a pressure regulation system for the cabin of the aircraft;

an altitude of a landing runway, supplied by the pressure regulation system of the cabin of the aircraft; and an altitude of a landing runway, supplied by a flight management system of the aircraft.

3. The method as claimed in claim 1, further comprising a step of defining an additional engagement threshold called default engagement threshold, and the step of automatically engaging said automated emergency descent uses this default engagement threshold as the engagement threshold for the automated emergency descent, in the absence of an engagement threshold other than this default engagement threshold.

4. The method as claimed in claim 1, further comprising the steps: determining a rate of variation of an altitude called cabin altitude;

comparing this rate of variation to a threshold value; and automatically engaging said automated emergency descent if said rate of variation exceeds said threshold value.

5. The method as claimed in claim 1, for an aircraft provided with a pressure regulation system of the cabin, configured to be able to be brought into a manual mode, in which the crew is able to manually select an altitude called cabin altitude, further comprising an additional step of defining an additional engagement threshold called auxiliary engagement threshold, this auxiliary engagement threshold depending on a maximum altitude that can be selected by the crew, and the step of automatically engaging said automated emergency descent uses this auxiliary engagement threshold as a new engagement threshold for the automated emergency descent, in place of said second engagement threshold, when the pressure regulation system of the cabin is in a manual mode.

6. The method as claimed in claim 1, further comprising an additional step comprising defining an additional engagement threshold called ceiling engagement threshold and the step of automatically engaging said emergency descent uses this ceiling engagement threshold as a new engagement threshold for the automated emergency descent, in case of failure rendering said second engagement threshold unavailable or unusable.

7. A device for automatically engaging an automated emergency descent of an aircraft, said device comprising:

a monitoring unit configured to automatically compare, repetitively, a current cabin altitude of the aircraft to a first engagement threshold representing an altitude value;

an activation unit configured to automatically engage said automated emergency descent when the current cabin altitude reaches said first engagement threshold; and a unit for generating a second engagement threshold configured at least to adapt said second engagement threshold according to a terrain, said second engagement threshold corresponding to a summed value of a terrain altitude and a predetermined margin associated with the terrain.

8. A system for implementing an automated emergency descent of an aircraft, said system comprising:

a control assembly configured to perform an automated emergency descent; and a device for automatically engaging the automated emergency descent, said device comprising:

a monitoring unit configured to automatically compare, repetitively, a current cabin altitude of the aircraft to a first engagement threshold representing an altitude value;

an activation unit configured to automatically engage said automated emergency descent when the current cabin altitude reaches said first engagement threshold; and a unit for generating a second engagement threshold configured at least to adapt said second engagement threshold according to a terrain, said second engagement threshold corresponding to a summed value of a terrain altitude and a predetermined margin associated with the terrain.

9. The system according to claim 8, further comprising incorporating the system into the aircraft.

10. The system as claimed in claim 9, wherein the aircraft comprises a flight management system and a pressure regulation system of a cabin of the aircraft which are configured to supply information to said device for automatically engaging the emergency descent.

* * * * *